United States Patent

Nishimoto et al.

Patent Number: 5,140,858
Date of Patent: Aug. 25, 1992

[54] METHOD FOR PREDICTING DESTRUCTION OF A BEARING UTILIZING A ROLLING-FATIGUE-RELATED FREQUENCY RANGE OF AE SIGNALS

[75] Inventors: Shigeto Nishimoto; Tomoyuki Saegusa, both of Osaka, Japan

[73] Assignee: Koyo Seiko Co. Ltd., Japan

[21] Appl. No.: 556,433

[22] Filed: Jul. 24, 1990

Related U.S. Application Data

[63] Continuation-in-part of Ser. No. 284,845, Dec. 13, 1988, abandoned, which is a continuation of Ser. No. 55,855, Jun. 1, 1987, abandoned.

[30] Foreign Application Priority Data

May 30, 1986 [JP] Japan .............................. 61-127040
May 30, 1986 [JP] Japan .............................. 61-127041

[51] Int. Cl.⁵ .......................... G01H 1/08; G01H 1/14
[52] U.S. Cl. ........................................ 73/587; 73/593; 340/682; 340/683; 364/551.02; 364/508
[58] Field of Search ................ 73/587, 593; 340/682, 340/683; 364/551.02, 508

[56] References Cited

U.S. PATENT DOCUMENTS

| | | |
|---|---|---|
| 4,493,042 | 1/1985 | Shima et al. ........................ 73/593 |
| 4,884,449 | 12/1989 | Nishimoto et al. .................. 73/587 |

FOREIGN PATENT DOCUMENTS

| | | | |
|---|---|---|---|
| 0104883 | 8/1979 | Japan | 340/682 |
| 0282258 | 12/1987 | Japan | 73/593 |
| 0271132 | 11/1988 | Japan | 73/593 |
| 0796995 | 1/1981 | U.S.S.R. | 73/593 |
| 1448232 | 12/1988 | U.S.S.R. | 73/593 |

*Primary Examiner*—Hezron E. Williams
*Assistant Examiner*—Rose M. Finley

[57] ABSTRACT

A method for predicting destruction of a bearing preliminarily finds frequency range of acoustic emission signals indicating fatigue of bearings. In order to find the fatigue-related frequency range, frequency components of electrical noise, mechanical noise, acoustic emissions (AE) due to slip of a bearing, and AE due to plastic-deformation of the bearing are respectively obtained under corresponding conditions, using a test equipment. Then, under a certain condition, combined AE signals of electrical noise, mechanical noise, slip-related AE, plastic-deformation-related AE and rolling-fatigue-related AE are generated. By subtracting the frequency components of electrical noise, mechanical noise, slip-related AE, plastic-deformation-related AE from frequency components of the combined AE signals, the fatigue-related frequency range is obtained. This frequency range is used to predict destruction of a bearing. AE signals in the preliminarily found frequency range are extracted from all acoustic emission signals detected. The extracted AE signals are converted into digital signals and compared with a predetermined reference value. When the digital signals exceed the predetermined reference value, a preliminary indication of inner destruction of the bearing is discriminated.

4 Claims, 9 Drawing Sheets

PART CHANGED IN STRUCTURE

CRACK

CRACK

METHOD FOR PREDICTING DESTRUCTION OF A BEARING UTILIZING A ROLLING-FATIGUE-RELATED FREQUENCY RANGE OF AE SIGNALS

This is a Continuation-in-part Application of application Ser. No. 07/284,845, filed Dec. 13, 1988, now abandoned, which was a Continuation Application Ser. No. 07/055,855, filed June 1, 1987, now abandoned.

BACKGROUND OF THE INVENTION

This invention relates to a method for predicting destruction of devices such as a bearing with the aid of acoustic emission.

Conventionally, a method of detecting abnormality in a bearing with the aid of acoustic emission has been utilized only for plain bearings. For example, the abnormality can be found out by detecting acoustic emission generated by damage on a metal surface caused by the friction generated between a sleeve and a bush when a lubricant film on a plain bearing is removed.

The above-described conventional method of detecting abnormality in a bearing is used, however, only to detect damage already existing on the surface of the sleeve or bush of a plain bearing, thus no preliminary indication can be detected by this method.

Accordingly, bearings required to ensure a stable operation such as, for example, bearings for an aircraft and a vehicle which may directly lead to fatal accidents, and bearings for water equipment and electrical power generators, which must work continuously for 24 hours without accidents, have been replaced frequently to achieve a high safety factor, i.e., even bearings which can continue to function well have been replaced and disposed. Some bearings are destroyed despite having sufficient safety factors, thus, resulting in a great deal of economical loss.

SUMMARY OF THE INVENTION

An object of the present invention is to provide a method for predicting destruction of a bearing by detecting a preliminary indication of destruction, e.g., changes in the inner structure of the bearing, by acoustic emission.

In order to accomplish the above object, a method for predicting destruction of a bearing of the present invention has the following steps of:

(a) preliminarily finding frequency range of acoustic emission signals indicative of fatigue of bearings;
(b) detecting acoustic emission signals from a bearing;
(c) extracting acoustic emission signals in said preliminarily found frequency range from all acoustic emission signals detected;
(d) converting extracted acoustic emission signals into digital signals;
(e) comparing the digital signals with a predetermined reference value; and
(f) discriminating preliminary indications of inner destruction of the bearing when the digital signals exceed the predetermined reference value.

In order to find frequency range of acoustic emission signals indicative of fatigue of bearings, acoustic emission signals or noises obtained under various conditions are analyzed using a test equipment, a basic construction of which is shown in FIG. 8, which is a block diagram showing the test equipment.

As shown in FIG. 8, the test equipment has a bearing rotator, a lubrication and drive apparatus for the bearing rotator, a control unit for controlling the lubrication and drive apparatus. The lubrication and drive apparatus includes a motor, an electromagnetic coupling for connecting the motor and the bearing rotator, lubricating oil pump, a valve provided between the lubricating oil pump and the bearing rotator, and a hydraulic unit for applying pressure onto a bearing.

The test equipment also has a sensor for detecting acoustic emission signals, an amplifier for amplifying acoustic emission signals detected by the sensor, an analog-to-digital converter, and a computer.

In the test equipment, acoustic emission signals generated under various conditions as described below are detected by the sensor, amplified by the amplifier, converted in a digital form by the analog-to-digital converter, and then analyzed by the computer.

First, of all units of the lubrication and drive apparatus, the motor and the lubricating oil pump are operated under the control by the control unit and the computer. The valve is now closed. Under this condition, acoustic emission is of only electrical noise. Therefore, through frequency analysis by the computer of acoustic emission signals generated under this condition, frequency components of electrical noise are obtained.

Next, frequency components of mechanical noise are obtained by first obtaining frequency components of combined electrical noise and mechanical noise which are generated by controlling the lubrication and drive apparatus so that all units but the hydraulic unit are operated, and then subtracting the frequency components of electrical noise, which have been already obtained in the previous step, from the frequency components of combined electrical noise and mechanical noise.

Next, the motor, the electromagnetic coupling and the bearing rotator are operated. The valve is now closed. Because lubricating oil is not provided to the bearing under this condition, slip occurs. Acoustic emission signals generated are frequency-analyzed. Frequency components of the acoustic emission signals consist of electrical noise, mechanical noise and acoustic emission due to slip. Therefore, the frequency components of the electrical and mechanical noises, which have been already obtained, are subtracted from the currently obtained frequency components, thereby slip-related frequency components are obtained.

Next, of all units of the lubrication and drive apparatus, only the hydraulic unit is operated. Pressure to be applied to the bearing is gradually increased, so that plastic deformation occurs in the bearing. Acoustic emission signals generated under this condition are only due to plastic deformation of the bearing. Thus, frequency components of the acoustic emission signals due to plastic deformation of the bearing are obtained through frequency analysis by the computer.

Finally, the whole lubrication and drive apparatus is operated. At this time high pressure or load is applied to the bearing. Acoustic emission signals generated under this condition include not only rolling-fatigue-related frequency components but also the frequency components related to electrical noise, mechanical noise, and slip and plastic deformation of the bearing. Therefore, the frequency components related to electrical noise, mechanical noise, slip and plastic deformation, which have been respectively obtained in the previous steps, are subtracted from the presently obtained frequency components. Frequency components obtained through the subtraction are of acoustic emission signals from the bearing due to its rolling fatigue, namely, due to cracks and structural changes beneath a rolling surface of the bearing.

In accordance with another embodiment, frequency components of combined acoustic emission signals of electrical noise, mechanical noise and acoustic emission due to slip of the bearing are obtained collectively at the same time, by operating the motor, the electromagnetic coupling and the lubricating oil pump with the valve closed. Steps following this step are the same as the above.

BRIEF DESCRIPTION OF THE DRAWINGS

The object and features of the present invention will become apparent from the following description taken in conjunction with the preferred embodiments thereof with reference to the accompanying drawings, in which.

DETAILED DESCRIPTION OF THE PREFERRED EMBODIMENTS

The embodiments of the present invention will be explained in the following, with reference to FIGS. 1 through 12.

Figure 8:
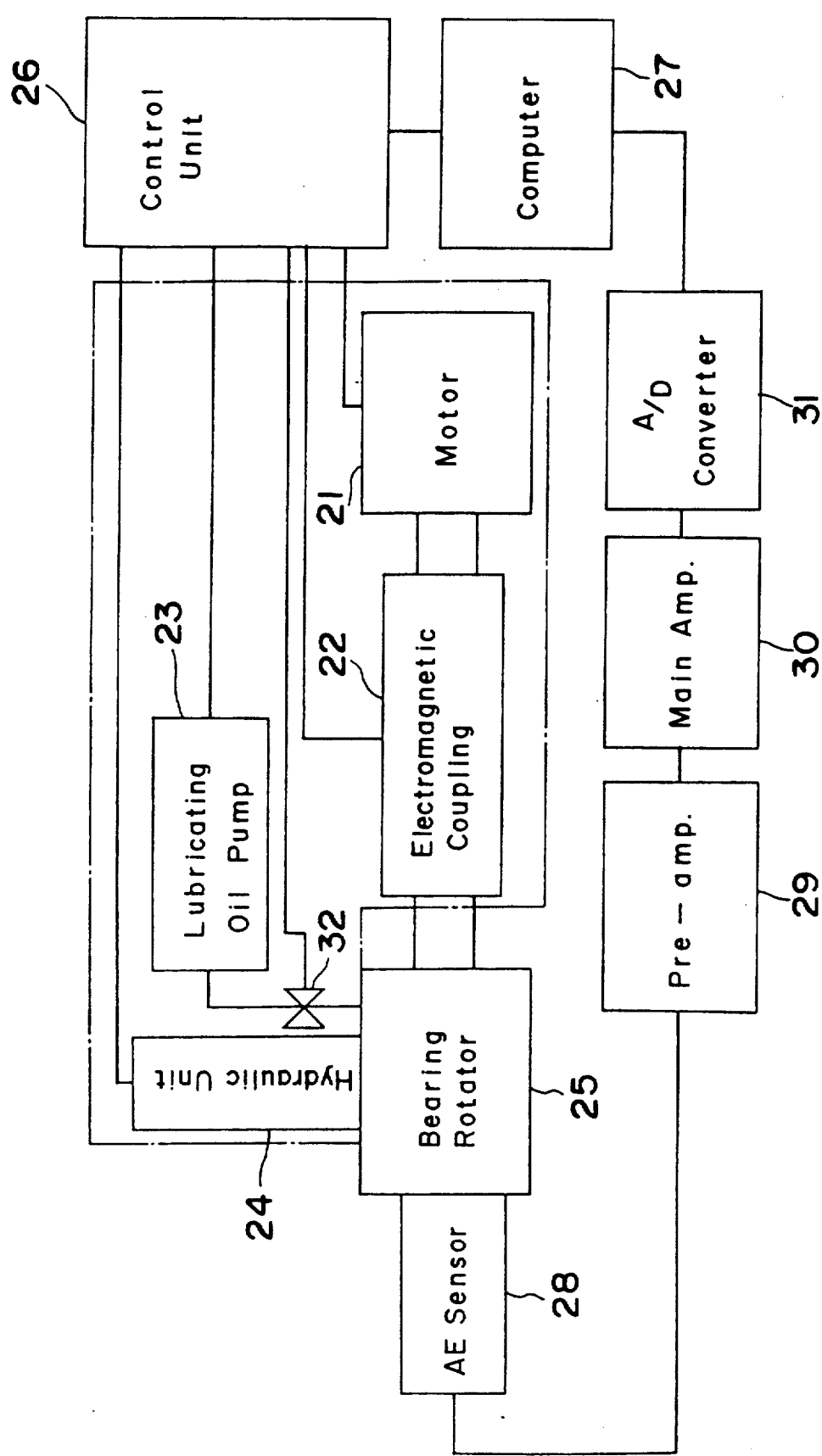
FIG. 8 is a block diagram showing a test equipment used to find frequency range of rolling-fatigue-related acoustic emission signals.

Referring first to FIG. 8, which shows a test equipment for generating acoustic emission signals of different kinds and analyzing frequencies of such acoustic emission signals, 21 represents a motor, 22 represents an electromagnetic coupling, 23 designates a lubricating oil pump, 24 designates a hydraulic unit, and 32 indicates a valve, these units constitutes a lubrication and drive apparatus for a bearing rotator 25 in the test equipment. Each unit of the lubrication and drive apparatus, which is enclosed by a dotted line in FIG. 8, is controlled by a control unit 26 which is also controlled by a computer 27. 28 indicates an acoustic emission (AE) sensor for detecting acoustic emission signals. Acoustic emission signals detected by the sensor 28 are then amplified first by a pre-amplifier 29 and then a main amplifier 30, and then converted in a digital form by an analog-to-digital (A/D) converter 31. The acoustic emission signals in a digital form are frequency-analyzed by the computer 27.

Frequency components of rolling-fatigue-related acoustic emission signals generated when a bearing has a structural change and cracks in its inner part are obtained in the following manner. Detection, amplification, A/D conversion and frequency analysis of acoustic emission signals are performed in the same way at each of the following steps.

Figure 9A:
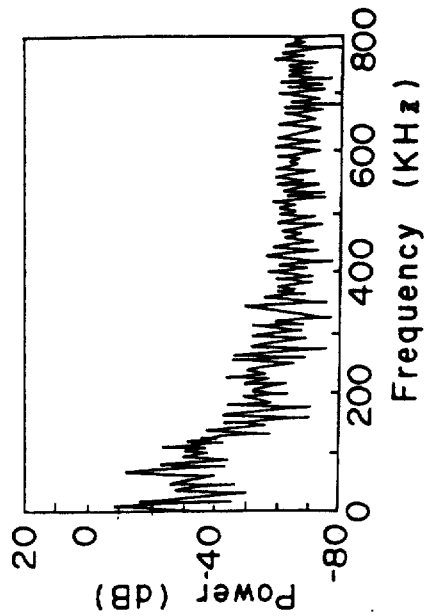
FIG. 9A shows a power spectrum of acoustic emission signals consisting of electrical noise.
Figure 9B:
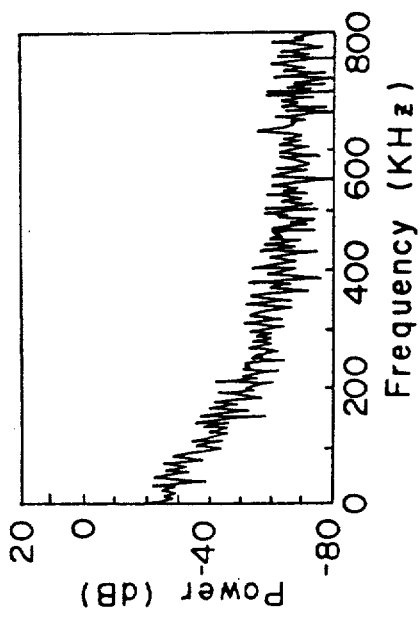
FIG. 9B shows a power spectrum of combined electrical noise and mechanical noise.
Figure 9C:
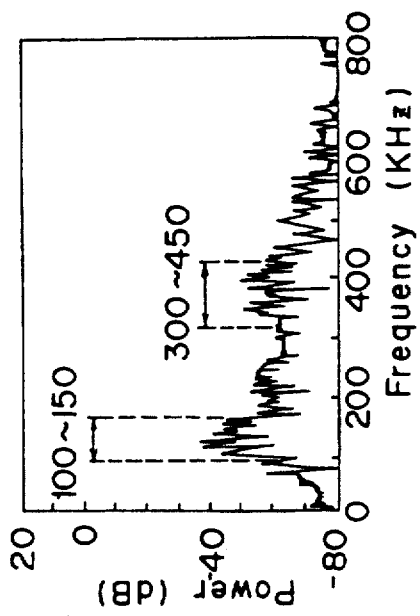
FIG. 9C shows a power spectrum of combined electrical noise, mechanical noise and slip-related acoustic emission signals.
Figure 11:
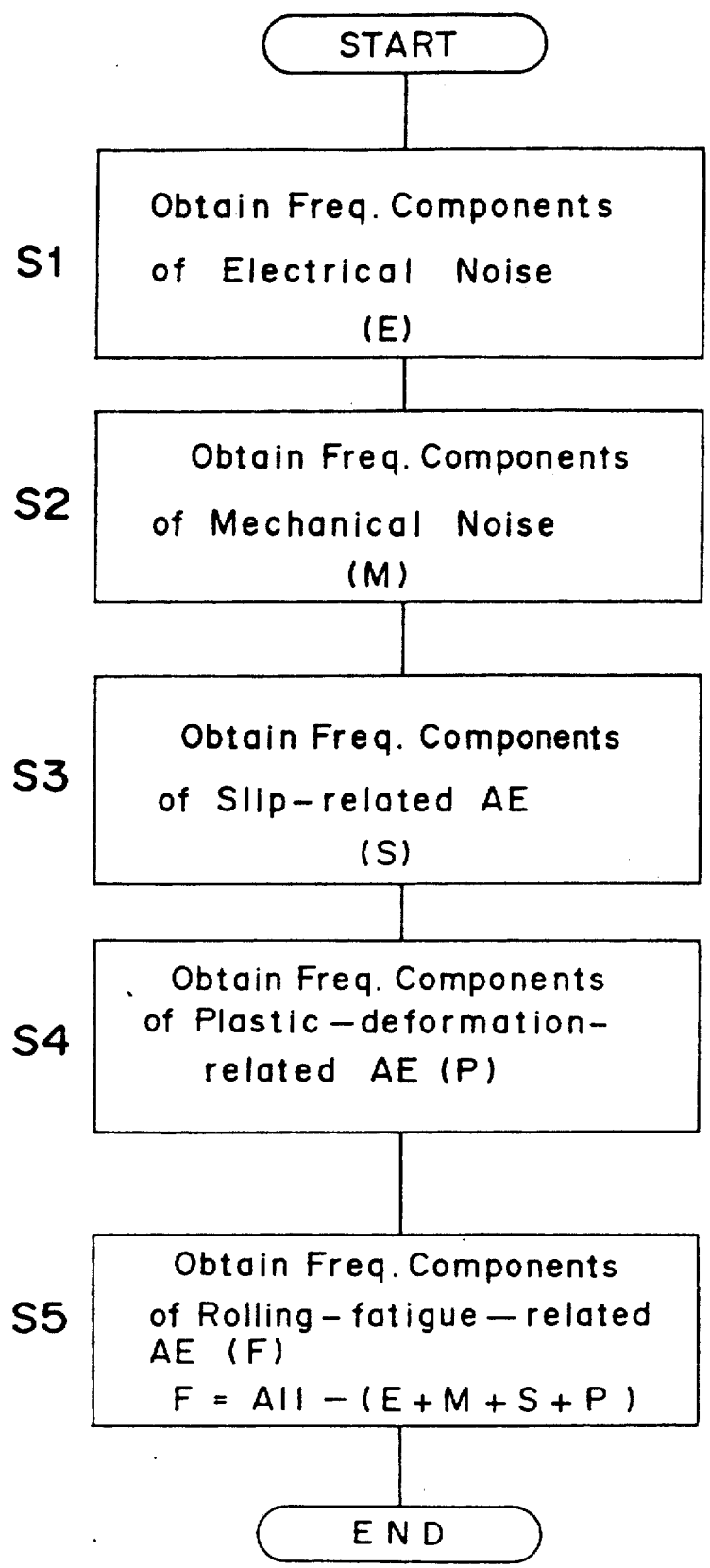
FIGS. 11 and 12 is are flow charts for obtaining fatigue-related frequency components.

As shown in FIG. 11, at step S1, frequency components of electrical noise are obtained by operating the motor 21 and the lubricating oil pump 23 from among the units of the lubrication and drive apparatus under the control of control unit 26. Under this condition, only electrical noise is generated. Therefore, frequency components obtained through frequency analysis of acoustic emission by the computer 27 are those of electrical noise. Power spectrum of the electrical noise is shown in FIG. 9A. The frequency components of the electrical noise are stored in a memory (not shown) of the computer 27 as digital data E, Next, at step S2, frequency components of mechanical noise are obtained in the following manner. At this step, all units other than the hydraulic unit 24 of the lubrication and drive apparatus are operated. In this case, not only mechanical noise but also electrical noise is generated. Power spectrum of the combined electrical noise and mechanical noise is shown in FIG. 9B. Therefore, the frequency components stored in the memory as data E are subtracted from frequency components currently obtained through the frequency analysis by the computer 27 in order to obtain frequency components of the mechanical noise, which are stored in the memory as digital data M.

Next, at step S3 frequency components of acoustic emission caused by slip of a bearing are obtained. In order to produce a condition in which slip of the bearing occurs, the motor 21, the electromagnetic coupling 22 and the lubricating oil pump 23 are operated. Because the valve 32 is closed and therefore lubricating oil is not supplied to the bearing, slip occurs. At this time, acoustic emission signals generated includes frequency components of electrical noise, mechanical noise, and slip-related acoustic emission. Therefore, the frequency components stored in the memory as data E and M are subtracted, so that frequency components of slip-related acoustic emission only are obtained and stored in the memory as digital data S.

Figure 9D:
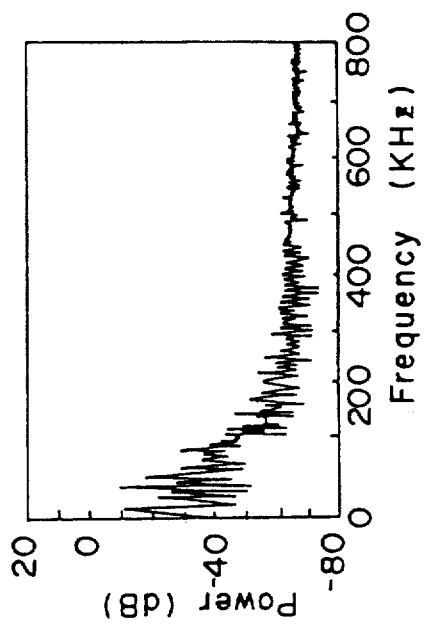
FIG. 9D shows a power spectrum of plastic-deformation-related acoustic emission signals.

Next, at step S4, only the hydraulic unit 24 of the lubrication and drive apparatus is operated. By operating the hydraulic unit 24 in such a manner that hydraulic pressure gradually increases, plastic deformation occurs to the bearing. Acoustic emission signals generated under this condition are related only to the plastic deformation of the bearing (See FIG. 9D). Therefore, frequency components currently obtained are stored as plastic-deformation-related data P. As shown in FIG. 9D, the frequency range 100–150 kHz and the frequency range 300–450 kHz are characteristic of the plastic-deformation-related acoustic emission.

Figure 10A:
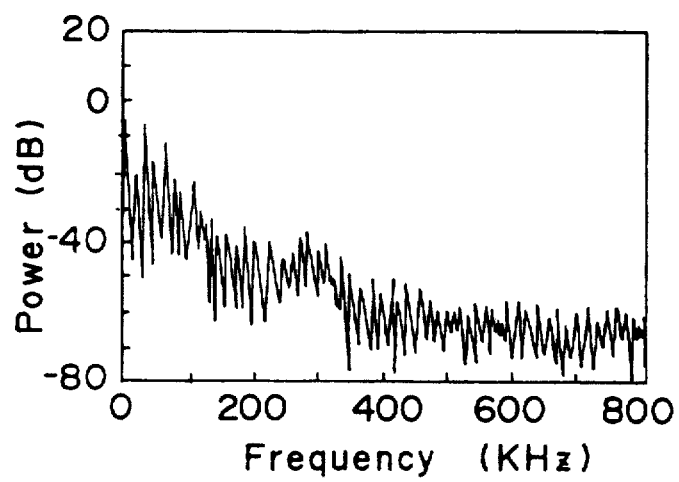
FIG. 10A shows a frequency analysis result of acoustic emission signals including not only rolling-fatigue-related acoustic emission signals but also electrical and mechanical noises, slip-related acoustic emission signals and plastic-deformation-related acoustic emission signals.
Figure 10B:
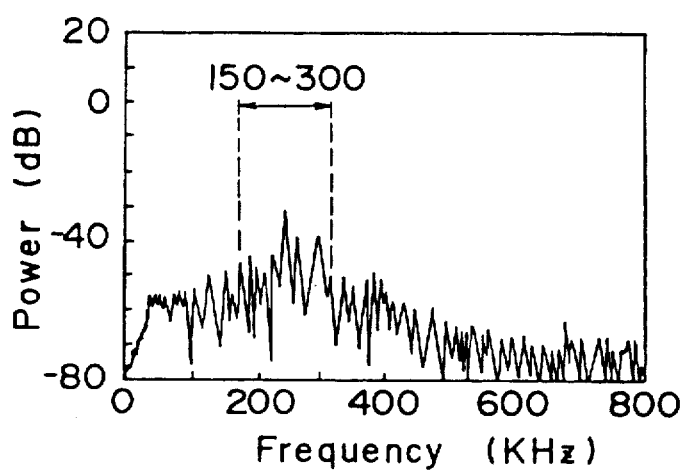
FIG. 10B shows a power spectrum of fatigue-related acoustic emission signals.

Next, at step S5, all units of the lubrication and drive apparatus are operated. At this time high load or pressure is applied to the bearing by the hydraulic unit 24. Acoustic emission signals generated under this condition includes not only rolling-fatigue-related acoustic emission signals but also electrical noise, mechanical noise, slip-related acoustic emission signals and plastic-deformation-related acoustic emission signals (See FIG. 10A). Therefore, the frequency components of the electrical noise E, mechanical noise M, slip-related acoustic emission signal S and plastic-deformation-related acoustic emission signal P are subtracted from all frequency components currently obtained. As a result, frequency components of rolling-fatigue-related acoustic emission signals which are shown in FIG. 10B are obtained. The power spectrum shown in FIG. 10B indicates that frequency components in the range of 150–300 kHz are characteristic of the rolling-fatigue-related acoustic emission.

Units operated to generate the above-classified acoustic emission signals are summarized in Table 1 below.

TABLE 1

|  | 21 | 22 | 23 | 32 | 24 |
| --- | --- | --- | --- | --- | --- |
| Electrical Noise | on | off | on | closed | off |
| Mechanical Noise | on | on | on | open | off |
| Slip-related AE | on | on | on | closed | off |
| Plastic-deformation-related AE | off | off | off | closed | on |
| Fatigue-related AE | on | on | on | open | on |

21: Motor.
22: Electromagnetic coupling.
23: Lubricating oil pump.
32: Valve.
24: Hydraulic unit.

According to the above method, frequency components of electrical noise, mechanical noise and slip-related acoustic emission signals are individually obtained and stored independent of each other in the memory.

Figure 12:
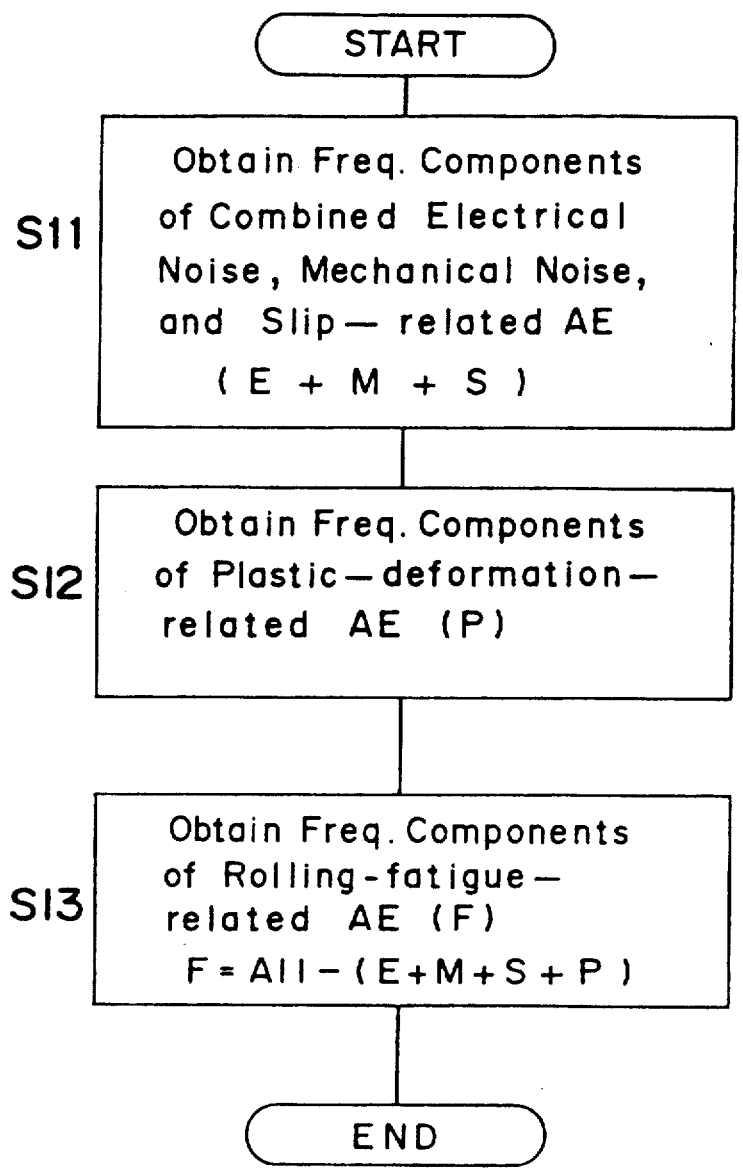

However, frequency components of the three kinds, i.e., combined electrical noise E, mechanical noise M and slip-related acoustic emission S may be obtained collectively at the same time as shown in FIG. 12. In this case, steps S11, S12 and S13 of FIG. 12 corresponds to steps S3, S4 and S5 of FIG. 11, respectively.

Figure 1:
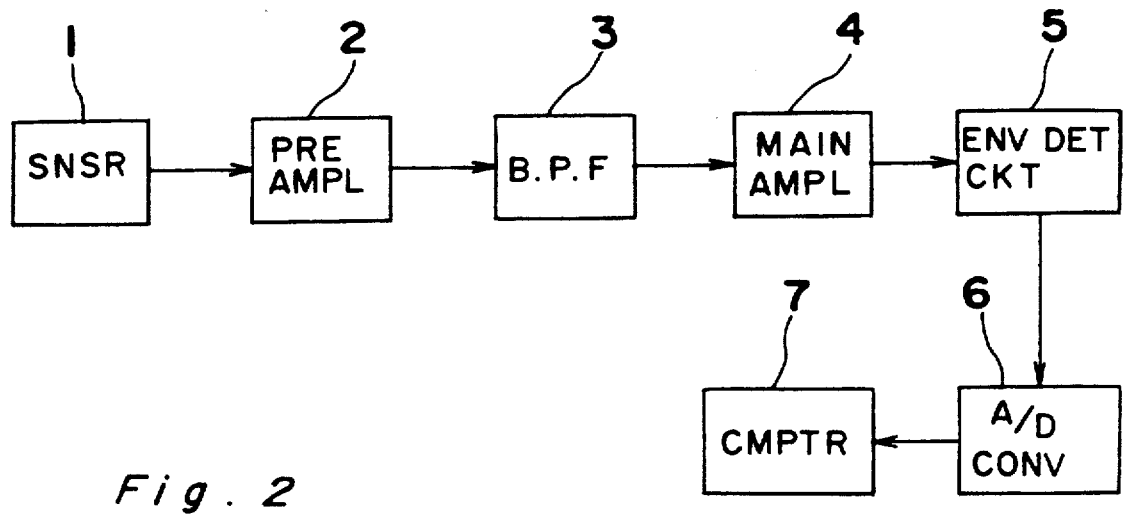
FIG. 1 is a block diagram of an apparatus for carrying out a method of predicting destruction of a bearing of the present invention.
Figure 2:
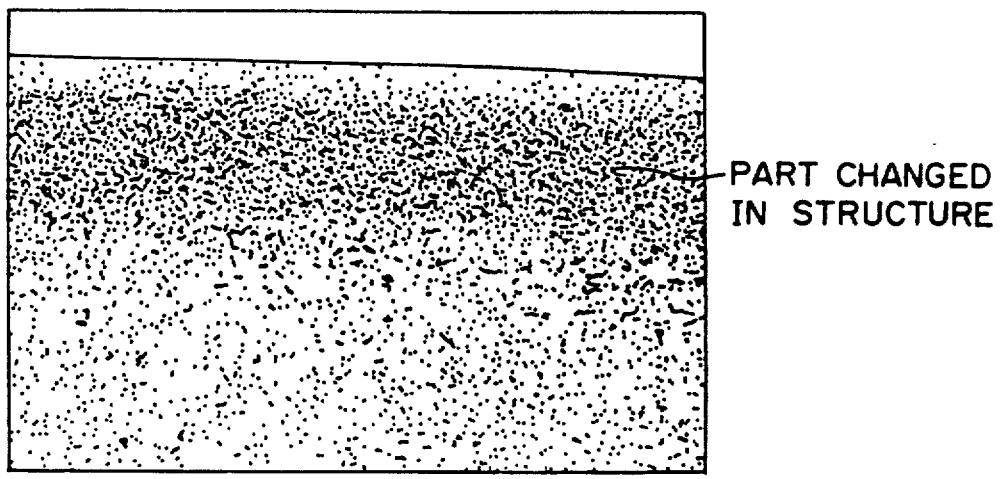
FIG. 2 and FIG. 3 show a structural change and cracks beneath a rolling surface of a bearing, respectively.
Figure 3:

Destruction or failure of a bearing is predicted by making use of the acoustic emission signals in the range 150–300 kHz which have been obtained as rolling-fatigue-related AE and therefore can be preliminary indication of destruction of a bearing. FIG. 1 shows an apparatus used to carry out the method of predicting destruction of a bearing of the present invention.

In FIG. 1, numeral 1 designates an acoustic emission sensor attached to a bearing for detecting acoustic emission from the bearing; numeral 2 designates a preamplifier; numeral 3 designates a band-pass filter through which signals representative of acoustic emission ranging from 150 to 300 kHz pass; numeral 4 a main amplifier; numeral 5 an envelope detection circuit; numeral 6 an analog-to-digital converter; and numeral 7 a computer as an operational unit which compares the acoustic emission signals from analog-to-digital converter 6 with reference values so that, when the above-mentioned signals exceed certain reference values, the computer may regard the exceeding as a preliminary indication of destruction and give a command to generate an alarm.

The acoustic emission signals detected by the sensor 1 are inputted into the band-pass filter 3 through the preamplifier 2, and only signal components of a frequency band ranging from 150 to 300 kHz are extracted as output signals. The output signals are further amplified by the main amplifier 4, and are processed by the envelope detection circuit 5 before being converted from analog to digital signals by means of the analog-to-digital converter 6, and then input to the computer 7. The computer 7 emits an alarm when the signals exceed the predetermined reference values. In this way, easy and precise prediction of the occurrence of bearing cracks becomes possible by detecting acoustic emission signals including signal components (of a frequency band ranging from 150 to 300 kHz) which have a relationship with the occurrence of changes, particularly generation of microcracks, in the inner structure of the bearing.

In the embodiment described above, the computer 7 compares the signals from the analog-to-digital converter 6 with reference values in order to detect preliminary indications of destruction; however, preliminary indications may be also detected by evaluating factors such as the number of occurrences, a waveform, an amplitude, an occurrence condition, etc. of the acoustic emission signals synthetically.

As described above, the apparatus for predicting destruction of a bearing detects acoustic emission signals ranging from 150 to 300 kHz, which have a relationship with changes in the inner structure of bearings, microcracks, and the processes of deterioration, by means of a band-pass filter; thus precise prediction of deteriorating conditions and life of bearings becomes possible. Therefore, according to the destruction predicting method of the present invention, replacement timing of bearings can be precisely determined for each application before the bearings are substantially destroyed, high precision equipment using bearings can be well maintained, and safety for human life can be better secured. Furthermore, the disadvantage that bearings which can still work well are replaced is eliminated.

Figure 4:
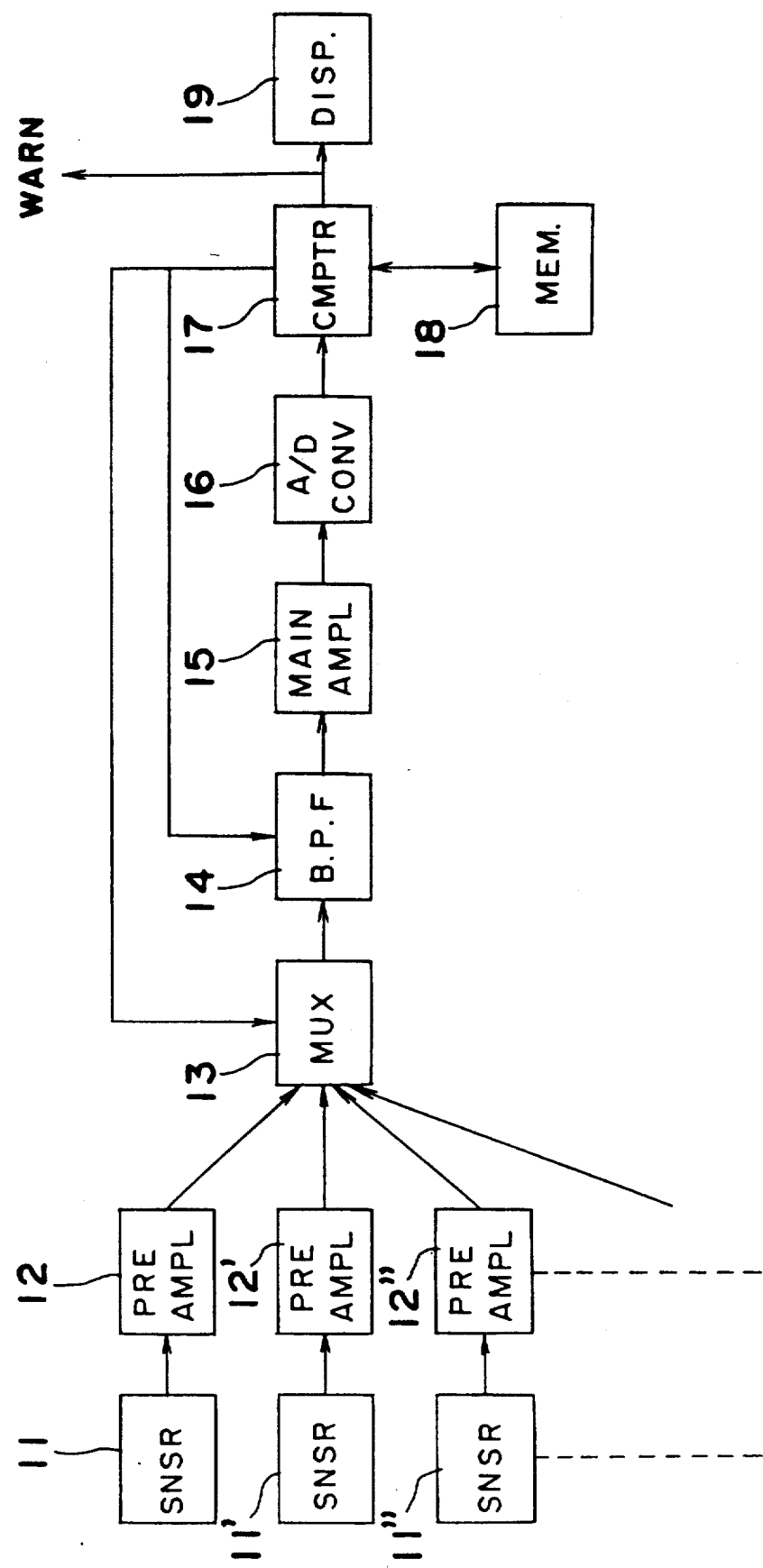
FIG. 4 is a block diagram of an example of an apparatus for predicting destruction of a device.

The following description refers to another apparatus for predicting destruction of a device. In FIG. 4, numerals 11, 11', 11'', ... are acoustic emission sensors; 12, 12', 12'', ... are preamplifiers; 13 is a multiplexer which switches the preamplifiers 12, 12', 12'', ... ; 14 is a band-pass filter which eliminates noise from acoustic emission signals; 15 is a main amplifier; 16 is an analog-to-digital converter; 17 is a computer as an operational unit; 18 is a memory which stores information representing waveforms of acoustic emission signals; 19 is a display device for displaying waveforms of acoustic emission signals; and the above-mentioned computer 17 outputs signals which control the multiplexer 13 and the band-pass filter 14.

Figure 6:
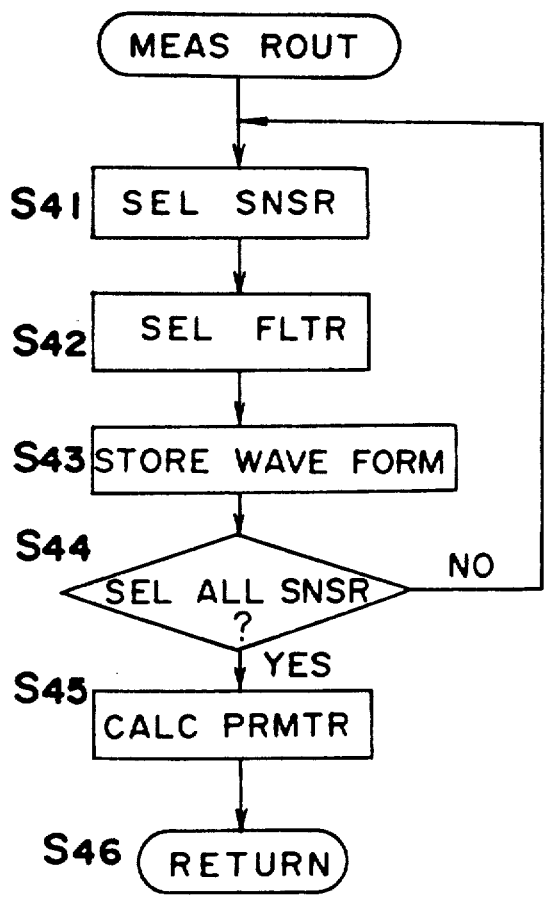
Figure 7:
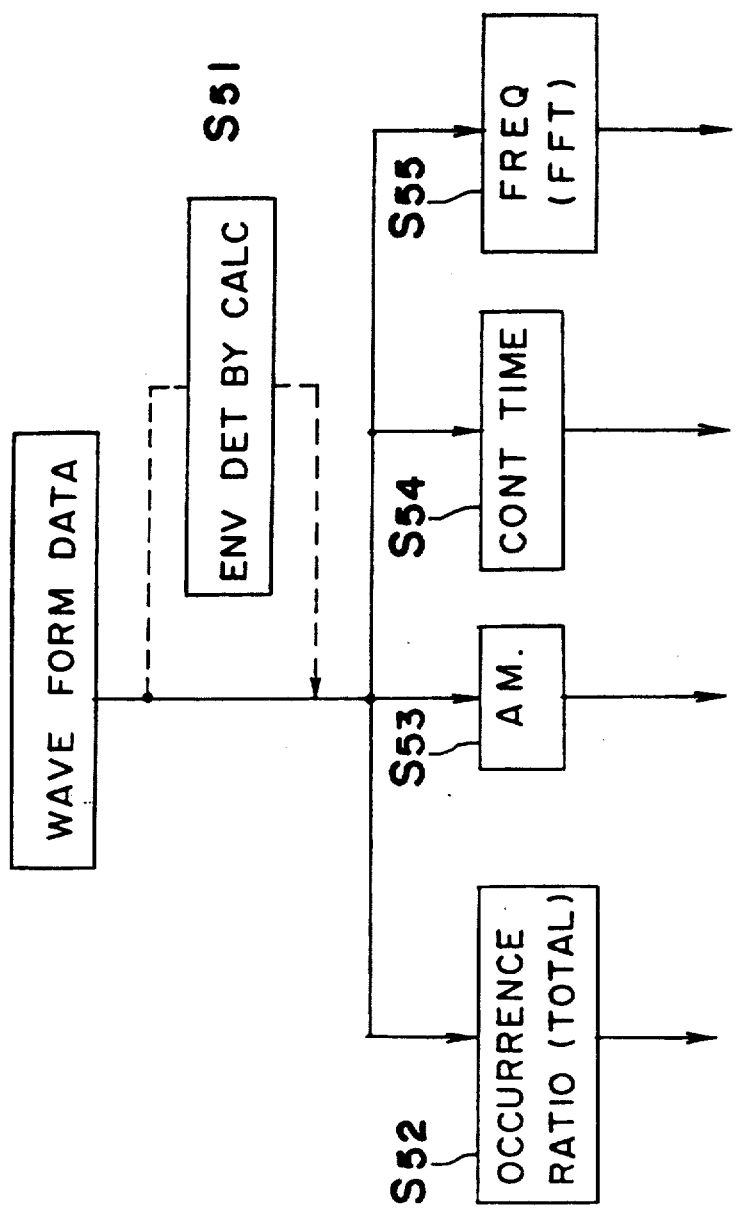
FIG. 7 is a flow chart showing parameter calculation.

Next, the operation of the apparatus is described below according to the flow charts shown in FIGS. 5–7.

Figure 5:
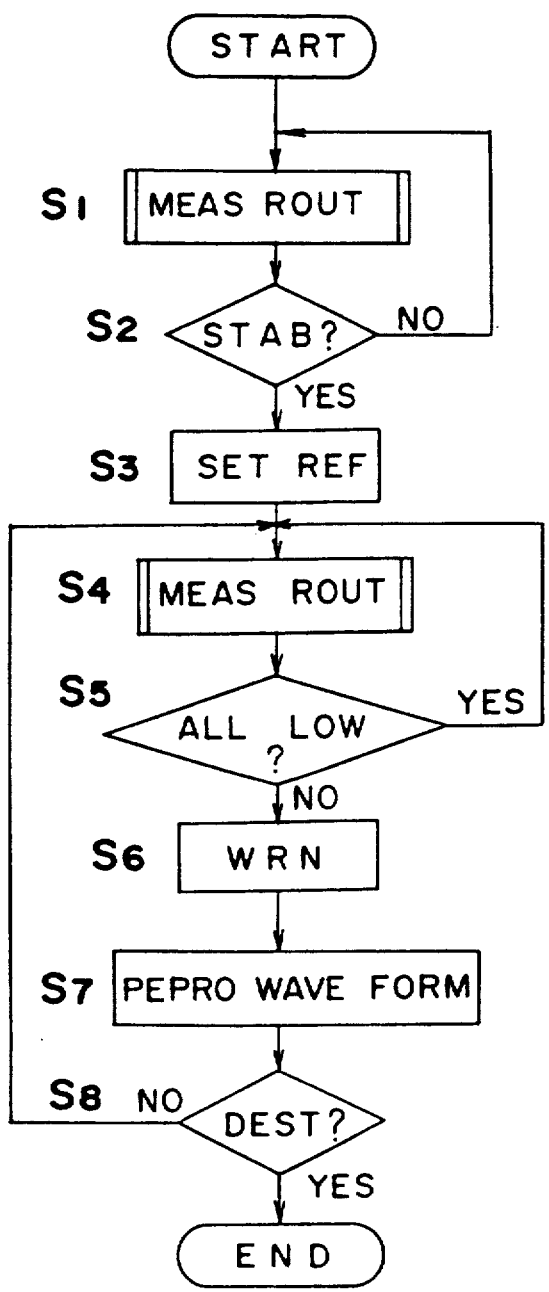
FIG. 5 and 6 are flow charts showing a computer algorithm.

When the computer 17 is started, a measurement routine is carried out at step $S_1$ as shown in FIG. 5. As shown by step $S_{41}$ in FIG. 6, in this measurement routine the multiplexer 13 is switched for selecting the acoustic emission sensor 11, 11', ... ; then, the program proceeds to the next step $S_{42}$, where a band of the band-pass filter 14 is selected according to the types and installation location of bearings to be checked. Next, the program proceeds to step $S_{43}$, where waveforms of acoustic emission signals are stored in the memory 18.

At step $S_{44}$, it is discriminated whether or not steps $S_{41}$, $S_{42}$, and $S_{43}$ have been executed with all the acoustic emission sensors; if not executed, the program returns to step $S_{41}$, and if executed, the program proceeds to step $S_{45}$. At step $S_{45}$, a parameter calculation is executed as shown in FIG. 7 according to the waveform data formerly stored. As shown in FIG. 7, this parameter calculation includes the following types of calculation: calculation, effected at step $S_{52}$, of occurrence rate (total number of occurrences), effected at step $S_{52}$ through counting of the number of times when signals representative of acoustic emission are at a level over a specified value for a specific frequency, calculation, carried out at step $S_{53}$, of the amplitude of the acoustic emission signals in a specific frequency band, calculation, effected at step $S_{54}$, of duration wherein acoustic emission signals remain above the specified level after being subjected to the envelope detection process shown in step $S_{51}$, calculation, carried out at step $S_{55}$, of components of the acoustic emission signals for specific frequencies by means of the high speed Fourier transformation.

After executing the measurement routine of the above-described step $S_1$, the program proceeds to step $S_2$ shown in FIG. 5, at which it is discriminated whether or not the parameters obtained by the above-mentioned parameter calculation are stabilized. If not, the program returns to step $S_1$, and if stabilized, then the program proceeds to step $S_3$, at which reference values are set by multiplying the above-mentioned parameter by a constant. By doing this, reference values for the signal indicative of acoustic emission of a bearing to be tested are properly set. Next, in order to actually predict destruction of bearings, the program proceeds to step $S_4$, and again the measurement routine shown in FIG. 6 is carried out in order to calculate parameters, i.e., occurrence rate, amplitude, duration, and signal components. Then, the program proceeds to the next step $S_5$, and the reference value obtained at step $S_3$ and the parameter obtained in step $S_4$ are compared. If all the parameters are lower than the respective levels of the reference values, the program returns to step $S_4$; if all the parameters are not lower than the levels of the respective reference values, then the situation is regarded as a preliminary indication of destruction; therefore, the program proceeds to step $S_6$ and generates an alarm. In step $S_7$, a measured waveform is displayed in the display device 19, and the waveform data stored in the memory 18 in the case that an appropriate prediction was done is reproduced in the display device 19 according to the instruction of an operator. In step $S_8$ the operator compares the measured waveform displayed with the reproduced waveform; if these waveforms are similar, the situation is deemed to be a preliminary indication of destruction; otherwise, the program returns back to step $S_4$ in order to continue the detection process.

In this way, it is possible not only to compare parameters with reference values in order to generate an alarm, but also to display waveforms of acoustic emission signals by means of the display device 19 in order to check predictions for appropriateness through a whole picture of waveforms; consequently, very precise destruction prediction becomes possible.

In step $S_5$ which consists of the discrimination means of the above-described embodiment, reference values of occurrence rate, amplitude, duration, and signal components at frequencies, and newly-obtained parameters of occurrence, amplitude, duration and signal components at frequencies are totally compared with one another in order to detect a preliminary indication of destruction; however, the preliminary indication detection can be also made by means of comparison of one or more items described above. Also, this apparatus predicts destruction by discriminating digitalized acoustic emission signals by means of a discrimination means comprised of software, accordingly, various parameters can be easily and inexpensively used.

As clarified in the description above, the apparatus for predicting destruction of a device according to the present invention has a sensor for acoustic emission from a device; an analog-to-digital converter for converting acoustic emission signals into digital signals; an operational unit for discriminating a preliminary indication of destruction by means of comparing digitalized acoustic emission signals with reference values; a memory which stores waveforms of acoustic emission signals; and a display device for displaying waveforms of acoustic emission signals; therefore, this system not only compares acoustic emission signals with reference values, but can also store waveforms of acoustic emission signals in order to check prediction for appropriateness through a complete picture of waveforms. Furthermore, prediction procedures are carried out based on digitalized parameters of amplitude, occurrence rate, duration, and signal components at the frequency band; consequently, a simple structure is obtained as well as having flexibility in selecting parameters.

Although the present invention has been described in connection with preferred embodiments thereof, many variations and modifications will now become apparent to those skilled in the art. It is preferred, therefore, that the present invention is limited not by the specific disclosure herein, but only by the appended claims.

What is claimed is:

1. A method for finding frequency range of acoustic emission signals indicative of fatigue of bearings, which is performed using a test equipment, said test equipment comprising:

a bearing rotator;

a lubrication and drive apparatus for the bearing rotator, wherein the lubrication and drive apparatus includes a motor, an electromagnetic coupling for connecting the motor and the bearing rotator, a lubricating oil pump, a valve provided between the lubricating oil pump and the bearing rotator, and a hydraulic unit for applying pressure onto a bearing;

a control unit for controlling each unit of the lubrication and drive apparatus;

a sensor for detecting acoustic emission signals;

an amplifier for amplifying acoustic emission signals detected by the sensor;

an analog-to-digital converter; and a computer which analyzes acoustic emission signals detected by the sensor, amplified by the amplifier, and then converted in a digital form and obtains frequency components of the acoustic emission signals; and said method comprising the steps of:

obtaining frequency components of electrical noise which is generated by controlling the lubrication and drive apparatus so that only both the motor and the lubricating oil pump are operated;

obtaining frequency components of mechanical noise by first obtaining frequency components of combined electrical noise and mechanical noise which are generated by controlling the lubrication and drive apparatus so that all units but the hydraulic unit are operated, and then subtracting the frequency components of electrical noise from the frequency components of combined electrical noise and mechanical noise;

obtaining frequency components of acoustic emission signals due to slip of the bearing by first obtaining frequency components of combined electrical noise, mechanical noise and the acoustic emission signals due to slip which are generated by controlling the lubrication and drive apparatus so that only the motor, the electromagnetic coupling, and the lubricating oil pump are operated, and then subtracting the frequency components already obtained of electric noise and mechanical noise from the frequency components of combined electrical noise, mechanical noise and the acoustic emission signals due to slip;

obtaining frequency components of acoustic emission signals due to plastic deformation of the bearing which are generated by controlling the lubrication and drive apparatus so that only the hydraulic unit is operated in such a manner that increasing pressure is applied to the bearing;

obtaining frequency components of acoustic emission signals which are generated by operating the whole lubrication and drive apparatus with appropriate pressure being applied to the bearing; and obtaining frequency components due to rolling fatigue of the bearing by subtracting the frequency components of electrical noise, mechanical noise, acoustic emission signals due to slip and plastic deformation of the bearing from the frequency components obtained when the whole lubrication and drive apparatus is operated.

2. A method of finding frequency range of acoustic emission signals indicative of fatigue of bearings, which is performed using a test equipment, said test equipment comprising:

a bearing rotator;

a lubrication and drive apparatus for the bearing rotator, wherein the lubrication and drive apparatus includes a motor, an electromagnetic coupling for connecting the motor and the bearing rotator, a lubricating oil pump, a valve provided between the lubricating oil pump and the bearing rotator, and a hydraulic unit for applying pressure onto a bearing;

a control unit for controlling each unit of the lubrication and drive apparatus;

a sensor for detecting acoustic emission signals;

an amplifier for amplifying acoustic emission signals detected by the sensor;

an analog-to-digital converter; and a computer which analyzes acoustic emission signals detected by the sensor, amplified by the amplifier, and then converted in a digital form and obtains frequency components of the acoustic emission signals; and said method comprising the steps of:

obtaining frequency components of combined electrical noise, mechanical noise and acoustic emission signals due to slip which are generated by controlling the lubrication and drive apparatus so that only the motor, the electromagnetic coupling, and the lubricating oil pump are operated;

obtaining frequency components of acoustic emission signals due to plastic deformation of the bearing which are generated by controlling the lubrication and drive apparatus so that only the hydraulic unit is operated in such a manner that increasing pressure is applied to the bearing;

obtaining frequency components of acoustic emission signals which are generated by operating the whole lubrication and drive apparatus with appropriate pressure being applied to the bearing; and obtaining frequency components due to rolling fatigue of the bearing by subtracting the frequency components of electrical noise, mechanical noise, acoustic emission signals due to slip and plastic deformation of the bearing from the frequency components obtained when the whole lubrication and drive apparatus is operated.

3. A method for predicting destruction of a bearing, comprising the steps of:

(a) preliminarily finding frequency range of acoustic emission signals indicative of fatigue of bearings using a test equipment, wherein said test equipment includes:

a bearing rotator;

a lubrication and drive apparatus for the bearing rotator, wherein the lubrication and drive apparatus includes a motor, an electromagnetic coupling for connection the motor and the bearing rotator, a lubricating oil pump, a valve provided between the lubricating oil pump and the bearing rotator, and a hydraulic unit for applying pressure onto a bearing;

a control unit for controlling each unit of the lubrication and drive apparatus;

a sensor for detecting acoustic emission signals;

an amplifier for amplifying acoustic emission signals detected by the sensor;

an analog-to-digital converter; and a computer which analyzes acoustic emission signals detected by the sensor, amplified by the amplifier, and then converted to a digital form and obtains frequency components of the acoustic emission signals; and said of preliminarily finding frequency range including the steps of:

obtaining frequency components of electrical noise which is generated by controlling the lubrication and drive apparatus so that only the motor and the lubricating oil pump are operated;

obtaining frequency components of mechanical noise by first obtaining frequency components of combined electrical noise and mechanical noise which are generated by controlling the lubrication and drive apparatus so that all units but the hydraulic unit are operated, and then subtracting the frequency components of electrical noise from the frequency components of combined electrical noise and mechanical noise;

obtaining frequency components of acoustic emission signals due to slip of the bearing by first obtaining frequency components of combined electrical noise, mechanical noise and the acoustic emission signals due to slip which are generated by controlling the lubrication and drive apparatus so that only the motor, the electromagnetic coupling, and the lubricating oil pump are operated, and then subtracting the frequency components already obtained of electric noise and mechanical noise from the frequency components of combined electrical noise, mechanical noise and the acoustic emission signals due to slip;

obtaining frequency components of acoustic emission signals due to plastic deformation of the bearing which are generated by controlling the lubrication and drive apparatus so that only the hydraulic unit is operated in such a manner that increasing pressure is applied to the bearing;

obtaining frequency components of acoustic emission signals which are generated by operating the whole lubrication and drive apparatus with appropriate pressure being applied to the bearing; and obtaining frequency components due to rolling fatigue of the bearing by subtracting the frequency components of electrical noise, mechanical noise acoustic emission signals due to slip and plastic deformation of the bearing from the frequency components obtained when the whole lubrication and drive apparatus is operated;

(b) detecting acoustic emission signals from a bearing;

(c) extracting acoustic emission signals in said preliminarily found frequency range from all acoustic emission signals detected;

(d) converting extracted acoustic emission signals into digital signals;

(e) comparing the digital signals with a predetermined reference value; and (f) discriminating preliminary indications of inner destruction of the bearing when the digital signals exceed the predetermined reference value.

4. A method for predicting destruction of a bearing, comprising the steps of:

(a) preliminarily finding frequency range of acoustic emission signals indicative of fatigue of bearings using a test equipment, wherein said test equipment includes:

a bearing rotator;

a lubrication and drive apparatus for the bearing rotator, wherein the lubrication and drive apparatus includes a motor, an electromagnetic coupling for connecting the motor and the bearing rotator, a lubricating oil pump, a valve provided between the lubricating oil pump and the bearing rotator, and a hydraulic unit for applying pressure onto a bearing;

a control unit for controlling each unit of the lubrication and drive apparatus;

a sensor for detecting acoustic emission signals;

an amplifier for amplifying acoustic emission signals detected by the sensor;

an analog-to-digital converter; and a computer which analyzes acoustic emission signals detected by the sensor, amplified by the amplifier, and then converted to a digital form and obtains frequency components of the acoustic emission signals; and said step of preliminarily finding frequency range including the steps of:

obtaining frequency components of combined electrical noise, mechanical noise and acoustic emission signals due to slip which are generated by controlling the lubrication and drive apparatus so that only the motor, the electromagnetic coupling, and the lubricating oil pump are operated;

obtaining frequency components of acoustic emission signals due to plastic deformation of the bearing which are generated by controlling the lubrication and drive apparatus so that only the hydraulic unit is operated in such a manner that increasing pressure is applied to the bearing;

obtaining frequency components of acoustic emission signals which are generated by operating the whole lubrication and drive apparatus with appropriate pressure being applied to the bearing; and obtaining frequency components due to rolling fatigue of the bearing by subtracting the frequency components of electrical noise, mechanical noise, acoustic emission signals due to slip and plastic deformation of the bearing from the frequency components obtained when the whole lubrication and drive apparatus is operated;

(b) detecting acoustic emission signals from a bearing;

(c) extracting acoustic emission signals in said preliminarily found frequency range from all acoustic emission signals detected;

(d) converting extracted acoustic emission signals into digital signals;

(e) comparing the digital signals with a predetermined reference value; and (f) discriminating preliminary indications of inner destruction of the bearing when the digital signals exceed the predetermined reference value.

* * * * *

UNITED STATES PATENT AND TRADEMARK OFFICE
CERTIFICATE OF CORRECTION

PATENT NO. : 5,140,858

DATED : August 25, 1992

INVENTOR(S) : Shigeto Nishimoto et al.

It is certified that error appears in the above-identified patent and that said Letters Patent is hereby corrected as shown below:

Column 10:
  In claim 3, line 25, "connection" should read --connecting--; and
  In claim 3, line 27, "said of" should read --said step of--.

Signed and Sealed this

Twenty-eighth Day of September, 1993

Attest:

BRUCE LEHMAN

Attesting Officer

Commissioner of Patents and Trademarks